United States Patent Office 3,584,014
Patented June 8, 1971

3,584,014
METHOD FOR THE PREPARATION OF (CIS-1,2-EPOXYPROPYL)-PHOSPHONIC ACID AND DERIVATIVES
Raymond A. Firestone, Fanwood, and Meyer Sletzinger, North Plainfield, N.J., assignors to Merck & Co., Inc., Rahway, N.J.
No Drawing. Filed June 2, 1969, Ser. No. 829,767
Int. Cl. C07f 9/38
U.S. Cl. 260—348
9 Claims

ABSTRACT OF THE DISCLOSURE

A method for the preparation of (cis-1,2-epoxypropyl)-phosphonic acid and its salt and ester derivatives, which comprises treating a [(1 - vinyloxy)methyl]phosphonic acid or a salt or ester thereof with a reagent capable of effecting ring closure. The (cis-1,2-epoxypropyl)phosphonic acid product thus obtained and its salts are antibiotics which have utility as antimicrobial agents in inhibiting the growth of gram-positive and gram-negative pathogenic bacteria.

---

This invention relates to a novel method for the preparation of (cis - 1,2 - epoxypropyl)phosphonic acid and its salt and ester derivatives via ring closure of a [(1-vinyloxy)methyl]phosphonic acid or a salt or ester derivative thereof.

(Cis-1,2-epoxypropyl)phosphonic acid and its salts, such as the sodium and calcium salts, are antimicrobial agents which have utility in inhibiting the growth of gram-positive and gram-negative pathogenic bacteria and are active against Bacillus, Escherichia, Staphylococci, Salmonella and Proteus pathogens, and antibiotic-resistant strains thereof. Thus, (cis-1,2-epoxypropyl)phosphonic acid and the salts thereof can be used as antiseptic agents to remove susceptible organisms from pharmaceutical, dental and medical equipment and can also be used in other areas subject to infection by such organisms.

In accordance with this invention (cis-1,2-epoxypropyl)-phosphonic acid and its salt and ester derivatives (I, infra) are obtained by treating a [(1-vinyloxy)methyl]phosphonic acid or a salt or ester thereof (II, infra) with a reagent capable of effecting ring closure as, for example, with a peroxide which will decompose at the temperature employed in the reaction including peroxides such as diacylperoxide as, for example, di-lower alkanoyl peroxide such as diacetyl peroxide or an aroyl peroxide such as dibenzoyl peroxide and the like or a di-lower alkyl peroxide such as tert-butyl peroxide and the like or 2,2'-azobisisobutyronitrile. The process may be conducted in any solvent in which the starting materials are reasonably soluble and which is substantially inert to the reactants employed. Suitable solvents include, for example, n-butyraldehyde, acetaldehyde, propionaldehyde, benzene, chlorobenzene and the like. The following equation illustrates this method of preparation:

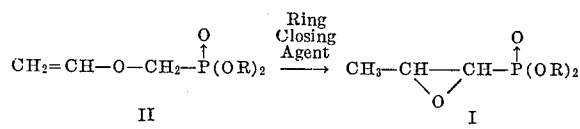

wherein R is hydrogen, lower alkyl, such as methyl, ethyl, n-propyl, isopropyl, n-butyl, pentyl and the like lower alkenyl such as allyl and the like, lower alkynyl such as propynyl and the like, aryl, for example, mononuclear aryl such as phenyl and the like, aralkyl, for example, mononuclear aralkyl such as benzyl, phenethyl and the like, a cation derived from an alkali metal such as the cation derived from sodium, potassium, lithium and the like or the R radicals may be joined to form the cation derived from an alkaline earth metal such as the cation derived from calcium, magnesium and the like, and when R is hydrogen, amine salts of the resulting acid, for example, an amine salt derived from pyridine, diethylamine, triethylamine, cyclohexylamine, benzylamine, quinine, piperidine alpha-phenethylamine, ethylene diamine, N,N'-dibenzyl ethylene diamine, glycine and the like. When R in the above equation represents a moiety other than hydrogen, then the resulting (cis-1,2-epoxypropyl)phosphonate can either be isolated per se as a product of this invention or the corresponding salt or ester derivative can be converted to the desired acid by the methods described below.

The ester derivatives of (cis - 1,2 - epoxypropyl)phosphonic acid may be converted to (cis - 1,2 - epoxypropyl)-phosphonic acid or its salts by various methods including treatment with an aqueous solution of a mineral acid such as hydrochloric acid or sulfuric acid under carefully buffered conditions, by hydrogenolysis, by treatment with an aqueous solution of an alkali metal or alkaline earth metal hydroxide or by treatment with trimethchlorosilane followed by aqueous hydrolysis. The method of choice depends largely upon the character of the particular ester which it is desired to convert to the corresponding acid or salt derivative. For example, when the ester is a dimethyl ester, the conversion to (cis - 1,2 - epoxypropyl)phosphonic acid is most advantageously conducted by treating the ester with trimethylchlorosilane followed by the aqueous hydrolysis of the silane ester intermediate thus obtained to afford the free acid. In addition, the alkyl esters of (cis-1,2-epoxypropyl)phosphonic acid and the aryl analogs thereof may be converted to the free acid by alkaline hydrolysis. However, due to the high degree of stability of the dialkyl (cis - 1,2 - epoxypropyl)phosphonates, the alkaline hydrolysis may afford the monoalkyl ester which may be converted to the desired acid by a second step, such as treatment with a photochemical agent or an acidic reagent to remove the remaining alkyl ester. When the ester is a dialkenyl ester, hydrogenolysis is particularly effective in converting the alkenyl (cis-1,2-epoxypropyl)-phosphonates to (cis-1,2-epoxypropyl)phosphonic acid.

[(1-vinyloxy)methyl]phosphonic acid and its corresponding salts and esters (II, infra) which are employed as starting materials in the preparation of (cis-1,2-epoxypropyl)-phosphonic acid and its salt and ester derivatives (I, supra) are obtained by treating a [1-haloethoxy) methyl]phosphonic acid or an ester thereof (III, infra) with a suitable base. Thus, for example, when it is desired to prepare the [(1 - vinyloxy)methyl]phosphonic acid precursor or an amine salt or an ester derivative thereof, it is most desirable to employ an organic base such as a tertiary amine as, for example, a tri-lower alkyl amine such as triethylamine and the like or a cyclic amine such as pyridine and the like. Also, when the esters of [(1-vinyloxy)methyl]phosphonic acid are desired, it is eminently necessary that the boiling point of the organic base employed be sufficiently different from the boiling point of the desired [(1-vinyloxy)methyl]phosphonate (II, infra) to allow for separation of the product by distillation. On the other hand, when it is desired to prepare the alkali metal or alkaline earth metal salts of [(1-vinyloxy)methyl]phosphonic acid, the base of choice may be any suitable inorganic base such as those derived from an alkali metal or alkaline earth metal including sodium hydroxide, calcium hydroxide, magnesium hydroxide, potassium hydroxide, lithium hydroxide, sodium bicarbonate, calcium carbonate and the like. The temperature at which the synthesis of the [(1-vinyloxy)methyl]phosphonic acid precursor and its salts and ester derivatives is conducted is not particularly critical but, as a practical matter, it is most desirable to conduct the reaction in the temperature range of from about 25° C. up to about 100° C. The following equation illustrates this method of preparation:

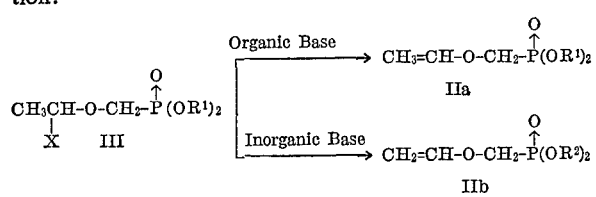

wherein $R^1$ is hydrogen, lower alkyl, such as methyl, ethyl, n-propyl, isopropyl, n-butyl, pentyl and the like, lower alkenyl such as allyl and the like, lower alkynyl such as propynyl and the like, aryl, for example, mononuclear aryl such as phenyl and the like, aralkyl, for example, mononuclear aralkyl such as benzyl, phenethyl and the like and when $R^1$ is hydrogen, amine salts of the resulting acid, for example, cyclic amine salts such as pyridine and the like or tri-lower alkyl amine salts such as triethyl amine salts and the like; $R^2$ is a cation derived from an alkali metal such as the cation derived from sodium, potassium, lithium and the like or the $R^2$ radicals may be joined to form the cation derived from an alkaline earth metal such as the cation derived from calcium, magnesium and the like, and X is halo such as chloro, bromo, fluoro, iodo and the like.

The (1-haloethoxy)methylphosphonic acid and its salts and esters (III) which are employed as starting materials in the preparation of the [(1-vinyloxy)methyl]phosphonic acid and its salts and esters (II, infra) are conveniently obtained by treating hydroxymethylphosphonic acid or an ester thereof (IV, infra) with acetaldehyde in the presence of a gaseous hydrogen halide such as gaseous hydrogen chloride, hydrogen bromide, hydrogen fluoride or hydrogen iodide and the like to afford the corresponding (1-haloethoxy)methylphosphonic acid or the ester analog thereof (III, infra). The following equation illustrates this method of preparation:

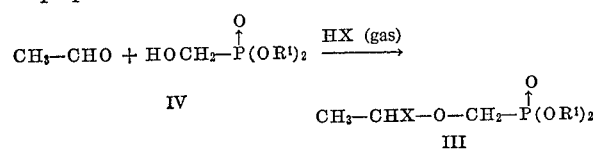

wherein $R^1$ and X are as defined above.

The hydroxymethylphosphonic acid esters (IV) employed as the reactants in the foregoing synthesis are either known compounds or can be obtained by methods well known to those skilled in the art. Thus, for example, the ester (IV) may be synthesized by treating a suitable alcohol with phosphorus trihalide in the presence of a strong base followed by the reaction of the phosphite derivative (V, infra) thus obtained with additional phosphorus trihalide to yield a halophosphine (VI, infra) and the resulting phosphine intermediate is then converted to the corresponding phosphinic acid diester (VII, infra) by treatment with a base and then to the desired hydroxy-methylphosphate (IV) via treatment with a stoichiometric excess of formaldehyde. The following equation illustrates this method of preparation:

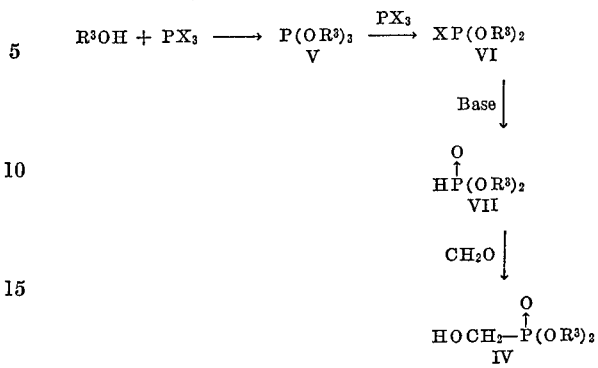

wherein $R^3$ is lower alkyl, lower alkenyl, lower alkynyl, aryl or aralkyl as defined above in respect of the definition of $R^1$, $PX_3$ is a phosphorus trihalide such as phosphorus trichloride, phosphorus tribromide, phosphorus triiodide and the like and X is as defined above. Suitable bases which may be used in converting the halophosphine intermediate (VI) to the phosphinic acid diester (VII) are sodium bicarbonate, potassium bicarbonate and the like.

In addition to the foregoing, the dimethyl ester of hydroxymethylphosphonic acid (IVb, infra) may also be obtained by treating the known free acid with diazomethane according to the following equation:

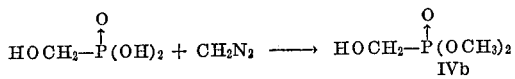

The dimethyl hydroxymethylphosphonate (IVb) thus obtained may be taken up in benzene to be used directly in the synthesis described above for the preparation of the (1-haloethoxy)methylphosphonic acid reactant or its corresponding phosphonate (III).

The following examples illustrate the method by which (cis-1,2-epoxypropyl)phosphonic acid and its salts and ester derivatives (II) may be obtained. However, the examples are illustrative only and should not be construed as being limited thereto since other functionally equivalent reagents may be substituted for the hydroxymethylphosphonic acid, hydroxymethylphosphonates and peroxide reagents recited therein to yield an identical (cis-1,2-epoxypropyl)phosphonic acid product and the corresponding salt and ester derivatives thereof.

EXAMPLE 1

Dimethyl (cis-1,2-epoxypropyl)phosphonate

Step A: Dimethyl (hydroxymethyl)phosphonate.—Hydroxymethylphosphonic acid (10.0 g.) is treated with two equivalents of diazomethane in 300 ml. of ether. The ether is then evaporated and the dimethyl hydroxymethylphosphonate thus obtained is taken up in benzene (50 ml.) to be used directly in the following step.

Step B: Dimethyl [(1-chloroethoxy)methyl]phosphonate.—Acetaldehyde (1.1 equivalents) is added to the solution of dimethyl hydroxymethylphosphonate in benzene obtained according to Step A and the solution is saturated at 10-15° C. with anhydrous hydrogen chloride (gas). After aging overnight at 25° C. the benzene is distilled in vacuo and the residue is then flushed three times with benzene to remove all traces of hydrogen chloride. The compound thus obtained is identified as dimethyl [(1-chloroethoxy)methyl]phosphonate.

Step C: Dimethyl [(1-vinyloxy)methyl]phosphonate.—A mixture of dimethyl [(1-chloroethoxy)methyl]phosphonate (10.0 g., 0.0494 mole) and pyridine (50 ml.) is slowly heated to 100° C. and held there for 30 minutes. The reaction mixture is cooled, filtered to remove pyridine hydrochloride, and the filtrate fractionally distilled under vacuum to yield dimethyl [(1-vinyloxy)methyl] phosphonate.

Step D: Dimethyl (cis-1,2-epoxypropyl)phosphonate.— A mixture of n-butyraldehyde (7.2 g., 0.1 mole) and dimethyl [(1-vinyloxy)methyl]phosphonate (4.2 g., 0.025 mole) and benzoyl peroxide (0.2 g., 0.0008 mole) is refluxed for 18 hours. The reaction mixture is cooled, washed successively with aqueous sodium bicarbonate and water and then dried over sodium sulfate. The solvent is removed under vacuum and the residue distilled under vacuum to yield dimethyl (cis-1,2-epoxypropyl)phosphonate.

EXAMPLE 2

Diethyl (cis-1,2-epoxypropyl)phosphonate

Step A: Diethyl(hydroxymethyl)phosphonate.—To a solution of ethanol (10.0 g.) and one equivalent of triethylamine in 100 ml. benzene is added, over a fifteen minute period at 0° C., one-third equivalent of phosphorus trichloride. Triethylamine hydrochloride is filtered off and the solvent removed in vacuo to yield triethylphosphite which is then purified by vacuum distillation.

The distilled triethylphosphite (10.0 g.) is mixed in the cold with one-half equivalent of phosphorus trichloride, allowed to stand at room temperature for 24 hours, and the resulting product fractionally distilled in vacuo to yield diethoxy chlorophosphine. The phosphine intermediate is then hydrolyzed by pouring onto ice containing one equivalent of sodium bicarbonate. The product thus obtained is extracted with ether, dried over sodium sulfate and vacuum distilled to yield diethylphosphite. Upon treatment with a stoichiometric excess of formaldehyde the diethylphosphite is converted to diethyl(hydroxymethyl)phosphonate.

Step B: Diethyl [(1-chloroethoxy)methyl]phosphonate.—By substituting diethyl(hydroxymethyl)phosphonate for the dimethyl(hydroxymethyl)phosphonate recited in Example 1, Step B, and following the procedure described therein the compound diethyl[(1-chloroethoxy) methyl]phosphonate is obtained.

Step C: Diethyl[(1-vinyloxy)methyl]phosphonate.— By substituting diethyl[(1-chloroethoxy)methyl]phosphonate for the dimethyl[(1-chloroethoxy)methyl]phosphonate recited in Example 1, Step C, and following the procedure described therein, the compound diethyl[(1-vinyloxy)methyl]phosphonate is obtained.

Step D: Diethyl(cis-1,2-epoxypropyl)phosphonate.—By substituting for the dimethyl[(1-vinyloxy)methyl]phosphonate and benzoyl peroxide as recited in Example 1, Step D, an equimolar quantity of diethyl[(1-vinyloxy) methyl]phosphonate and tertiary butyl peroxide and following the procedure described therein, diethyl(cis-1,2-epoxypropyl)phosphonate is obtained.

In a manner similar to above, the following compounds may be prepared. Thus, by substituting for the ethanol recited in Step A, Example 2, an equimolar quantity of allyl alcohol, benzyl alcohol, n-butyl alcohol, phenethyl alcohol or phenol and by following substantially the procedure described therein, there is thus obtained the corresponding diallyl(hydroxymethyl)phosphonate,
dibenzyl(hydroxymethyl)phosphonate,
di-n-butyl(hydroxymethyl)phosphonate,
diphenethyl(hydroxymethyl)phosphonate, and
diphenyl(hydroxymethyl)phosphonate, which compounds when substituted for the diethyl(hydroxymethyl)phosphonate of Step B, Example 2, and treated according to the procedure described therein, affords the corresponding diallyl[(1-chloroethoxy-methyl]phosphonate,
dibenzyl[(1-chloroethoxy)methyl]phosphonate,
di-n-butyl[(1-chloroethoxy)methyl]phosphonate,
diphenethyl[(1-chloroethoxy)methyl]phosphonate, and
diphenyl[(1-chloroethoxy)methyl]phosphonate which, when substituted for the diethyl[(1-chloroethoxy) methyl]phosphonate of Step C, Example 2, and treated according to the procedure described therein, results in the formation of the corresponding diallyl[(1-vinyloxy)methyl]phosphonate,
dibenzyl[(1-vinyloxy)methyl]phosphonate,
di-n-butyl[(1-vinyloxy)methyl]phosphonate,
diphenethyl[(1-vinyloxy)methyl]phosphonate, and
diphenyl[(1-vinyloxy)methyl]phosphonate which, when substituted for the diethyl[(1-vinyloxy)-methyl]phosphonate of Step D, Example 2, and by following substantially the procedure described therein affords, respectively, the desired diallyl(cis-1,2-epoxypropyl)phosphonate,
dibenzyl(cis-1,2-epoxypropyl)phosphonate,
di-n-butyl(cis-1,2-epoxypropyl)phosphonate,
diphenethyl(cis-1,2-epoxypropyl)phosphonate and
diphenyl(cis-1,2-epoxypropyl)phosphonate.

EXAMPLE 3

(Cis-1,2-epoxypropyl)phosphonic acid and disodium salt

Step A: [(1-chloroethoxy)methyl]phosphonic acid.— Acetaldehyde (1.1 mole) and (hydroxymethyl)phosphonic acid (1 mole) in benzene (500 ml.) are saturated with hydrogen chloride gas at 10–15° C. The mixture is allowed to stand at 25° C. for 24 hours, the solvent is distilled under vacuum and the residue is flushed three times with benzene to remove all traces of hydrogen chloride. The oily residue thus obtained is [(1-chloroethoxy)methyl]phosphonic acid.

Step B: [(1-vinyloxy)methyl]phosphonic acid disodium salt.—A mixture of [(1-chloroethoxy)methyl]phosphonic acid (10.0 g.) in pyridine (50 ml.) is slowly heated to 100° C. and held there for 30 minutes. The reaction mixture is cooled, filtered to remove pyridine hydrochloride and the solvent is removed from the filtrate to yield [(1-vinyloxy)methyl]phosphonic acid pyridinium salt. The pyridinium salt is dissolved in ether and treated with a stoichiometric amount of sodium hydride to afford [(1-vinyloxy)methyl]phosphonic acid disodium salt.

Step C: (Cis-1,2-epoxypropyl)phosphonic acid disodium salt.—To a suspension of [(1-vinyloxy)methyl] phosphonic acid disodium salt (0.025 mole) in benzene (50 ml.) is added benzoyl peroxide (2.0 g., 0.008 mole). The reaction mixture is refluxed for 18 hours and the solvent removed under vacuum to yield (cis-1,2-epoxypropyl)phosphonic acid disodium salt.

Step D: (Cis-1,2-epoxypropyl)phosphonic acid.—The disodium salt of (cis-1,2-epoxypropyl)phosphonic acid obtained according to Step C is taken up in 20 ml. of water at 0° C. and passed through a column containing 25 g. of an ion-exchange resin (Amberlite I.R. 120 resin) on the hydrogen cycle. Elution with 20 ml. of water at 0° C. yields free (cis-1,2-epoxypropyl)phosphonic acid.

EXAMPLE 4

(Cis-1,2-epoxypropyl)phosphonic acid dipotassium salt

Step A: Dipotassium[(1-vinyloxy)methyl]phosphonate.—A solution of dipotassium[(1-chloroethoxy)methyl] phosphonate, obtained by the reaction of [(1-chloroethoxy)methyl]phosphonic acid with two equivalents of potassium hydride in tetrahydrofuran is heated with pyridine at 100° C. for 30 minutes. The reaction mixture is cooled and filtered to remove pyridine hydrochloride and the solvent removed under vacuum to yield dipotassium[(1-vinyloxy)methyl]phosphonate.

Step B: (Cis-1,2-epoxypropyl)phosphonic acid dipotassium salt. — Dipotassium[(1 - vinyloxy)methyl] phosphonate, n-butyraldehyde and benzoyl peroxide are mixed together and refluxed for 18 hours. The reaction mixture is cooled and the solvent is removed under vacuum and the residue is washed with ether to yield (cis-1,2-epoxypropyl)phosphonic acid dipotassium salt.

EXAMPLE 5

(Cis-1,2-epoxypropyl)phosphonic acid

Step A: [(1-vinyloxy)methyl]phosphonic acid.—[(1-vinyloxy)methyl]phosphonic acid disodium salt is suspended in n-butyraldehyde and slightly less than 2 equivalents of dry hydrogen chloride gas is bubbled through the suspension. The suspension is then filtered to remove the sodium chloride. The resulting filtrate containing [(1-vinyloxy)methyl]phosphonic acid is used in the next step without further purification.

Step B: (Cis-1,2-epoxypropyl)phosphonic acid.—To the solution of [(1-vinyloxy)methyl]phosphonic acid in n-butyraldehyde is added benzoyl peroxide. The mixture is refluxed for 18 hours and then cooled. The solvent is removed under vacuum to yield (cis-1,2-epoxypropyl)phosphonic acid.

EXAMPLE 6

(Cis-1,2-epoxypropyl)phosphonic acid disodium salt

Step A: [(1-vinyloxy)methyl]phosphonic acid disodium salt.—A solution of sodium hydroxide (0.148 mole) in water is added to a suspension of dimethyl[(1-chloroethoxy)methyl]phosphonate (10.0 g., 0.0494 mole) in water. The mixture is heated and stirred for 8 hours. Removal of the water yields [(1-vinyloxy)methyl]phosphonic acid disodium salt.

Step B: (Cis-1,2-epoxypropyl)phosphonic acid disodium salt.—By following the procedure as described in Step C of Example 3, (cis-1,2-epoxypropyl)phosphonic acid disodium salt is obtained.

EXAMPLE 7

(Cis-1,2-epoxypropyl)phosphonic acid calcium salt

Step A: [(1-vinyloxy)methyl]phosphonic acid calcium salt.—To a suspension of calicum hydroxide (0.074 mole) in water (100 ml.) is added diethyl[(1 - chloroethoxy)methyl]- phosphonate (0.0494 mole). The mixture is refluxed until neutral and the water removed to yield [(1-vinyloxy)methyl]phosphonic acid calcium salt.

Step B: (Cis - 1,2-epoxypropyl)phosphonic acid calcium salt.—To a suspension of [(1-vinyloxy)methyl]phosphonic acid calcium salt (0.025 mole) in benzene (50 ml.) is added benzoyl peroxide (2.0 g., 0.08 mole). The reaction mixture is refluxed for 18 hours and the solvent removed under vacuum to yield (cis - 1,2 - epoxypropyl) phosphonic acid calcium salt.

EXAMPLE 8

(Cis-1,2-epoxypropyl)phosphonic acid pyridinium salt

Step A: [(1 - vinyloxy)methyl]phosphonic acid pyridinium salt.—A mixture of [(1 - chloroethoxy)methyl] phosphonic acid (10.0 g.) in pyridine (50 ml.) is slowly heated to 100° C. and held there for 30 minutes. The reaction mixture is cooled, filtered to remove pyridine hydrochloride and the excess solvent is removed from the filtrate to yield the [(1-vinyloxy)methyl]phosphonic acid pyridinium salt.

Step B: (Cis - 1,2 - epoxypropyl)phosphonic acid pyridinium salt.—To a suspension of [(1-vinyloxy)methyl] phosphonic acid pyridinium salt (0.025 mole) in benzene (50 ml.) is added benzoyl peroxide (2.0 g., 0.08 mole). The reaction mixture is refluxed for 18 hours and the solvent removed under vacuum to yield (cis-1,2-epoxypropyl)phosphonic acid pyridinium salt.

By substituting triethylamine for the pyridine recited in Example 8, Step A, and following substantially the procedure described therein, there is obtained [(1-vinyloxy)-methyl]phosphonic acid triethylammonium salt which when substituted for the [(1-vinyloxymethyl)phosphonic acid pyridinium salt of Step B and by following substantially the procedure described therein affords (cis - 1,2-epoxypropyl)phosphonic acid triethylammonium salt.

In a manner similar to that described in Example 2, the [(1-haloethoxy)methyl]phosphonic acid ester derivatives may be obtained by substituting the appropriate starting materials for those described in Steps A and B of that example, which may then be converted to the alkali metal and alkaline earth metal salts of (cis-1,2-epoxypropyl)-phosphonic acid by following the procedure as described in Example 6 or 7. The following equation illustrates the reaction of Example 2, Steps A and B, and Example 6, Steps A and B, and, in conjunction with Table I, infra, describe the several varieties of phosphorous trihalide, hydrogen halide, peroxides and metallic hydroxides which may be employed in the process of this invention and, also, the cis - 1,2 - epoxypropyl)phosphonic salts derived therefrom:

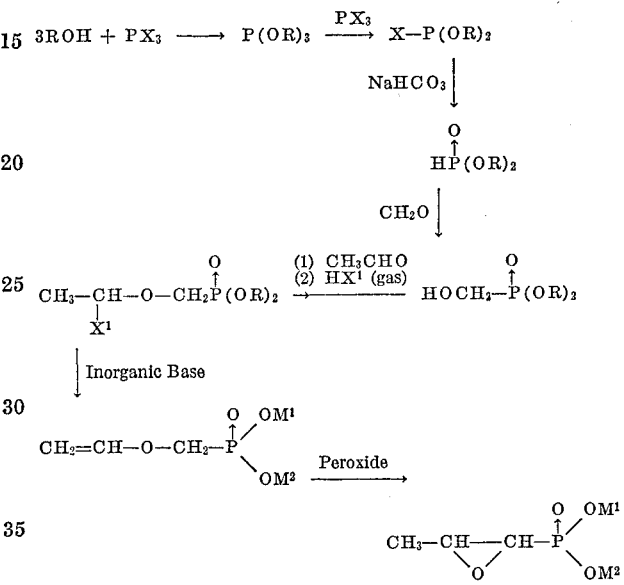

TABLE I

| Example | R | X | X¹ | M¹ | M² | Peroxide | Inorganic base |
|---|---|---|---|---|---|---|---|
| 9 | —(CH₂)₂CH₃ | Cl | Cl | Na | Na | Diacetyl peroxide. | NaOH |
| 10 | —CH₂—C≡CH | Cl | Cl | —Ca— | | Dibenzoyl peroxide | Ca(OH)₂ |
| 11 | —CH(CH₃)₂ | Cl | I | —Ca— | | Di-tert-butyl peroxide. | Ca(OH)₂ |
| 12 | —(CH₂)₄CH₃ | Cl | Br | —Ca— | | Dibenzoyl peroxide. | Ca(OH)₂ |
| 13 | —C₃H₅ | Cl | Cl | Li | Li | ....do.... | LiOH |
| 14 | —C₃H₅ | Br | I | —Mg— | | ....do.... | Mg(OH)₂ |

The above examples are illustrative of the novel method disclosed and it is to be understood that the invention is not to be limited by the specific illustrative examples but rather embraces all the variations and modifications thereof which fall within the scope of the foregoing discussion and the appended claims.

We claim:

1. A process for the preparation of a compound having the formula:

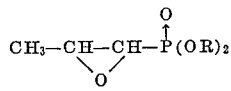

wherein R is hydrogen, lower alkyl, lower alkenyl, lower alkynyl, aryl, aralkyl, the cation derived from an alkali metal or the R radicals may be joined to form a cation derived from an alkaline earth metal or when R is hydrogen amine salts of the resulting acid; which comprises treating a compound having the formula:

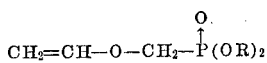

wherein R is as defined above; with a reagent selected from a peroxide or 2,2-azobisisobutyronitrile.

2. A process according to claim 1 for the preparation of the alkali metal salts of (cis-1,2-epoxypropyl)phosphonic acid; which comprises treating an alkali metal salt of ](1-vinyloxy)methyl)methyl]phosphonic acid with a reagent selected from a peroxide or 2,2-azobisisobutyronitrile.

3. A process according to claim 1 for the preparation of the alkaline earth metal salt of (cis-1,2-epoxypropyl)-phosphonic acid; which comprises treating an alkaline earth metal salt of [(1-vinyloxy)methyl]phosphonic acid with a reagent selected from a peroxide of 2,2-azobisisobutyronitrile.

4. The process of claim 1 wherein the reagent is selected from an aroyl peroxide, a diacyl peroxide, a di-lower alkyl peroxide or 2,2-azobisisobutyronitrile.

5. The process of claim 1 whereint he peroxide is selected from benzoyl peroxide, diacetyl peroxide or tertitary butyl peroxide.

6. The process of claim 2 wherein the reagent is selected from an aroyl peroxide, a diacyl peroxide or a di-lower alkyl peroxide.

7. The process of claim 2 wherein the peroxide is selected from benzoyl peroxide, diacetyl peroxide or tertiary butyl peroxide.

8. The process of claim 3 wherein the reagent is selected from an aroyl peroxide, a diacyl peroxide or a di-lower alkyl peroxide.

9. The process of claim 3 wherein the peroxide is selected from benzoyl peroxide, diacetyl peroxide or tertiary butyl peroxide.

No references cited.

NORMA S. MILESTONE, Primary Examiner

U.S. Cl. X.R.

260—950, 502.4